(12) United States Patent
Altaparmakov

(10) Patent No.: US 10,521,126 B2
(45) Date of Patent: Dec. 31, 2019

(54) SYSTEMS AND METHODS FOR WRITING BACK DATA TO A STORAGE DEVICE

(71) Applicant: Tuxera Inc., Espoo (FI)

(72) Inventor: Anton Ivanov Altaparmakov, Great Chesterford (GB)

(73) Assignee: Tuxera, Inc., Espoo (FI)

(*) Notice: Subject to any disclaimer, the term of this patent is extended or adjusted under 35 U.S.C. 154(b) by 113 days.

(21) Appl. No.: 15/672,969

(22) Filed: Aug. 9, 2017

(65) Prior Publication Data

US 2018/0046385 A1  Feb. 15, 2018

Related U.S. Application Data

(60) Provisional application No. 62/373,650, filed on Aug. 11, 2016.

(51) Int. Cl.
| | | |
|---|---|---|
| G06F 3/06 | (2006.01) | |
| G06F 12/0868 | (2016.01) | |
| G06F 9/54 | (2006.01) | |
| G06F 12/0804 | (2016.01) | |
| G06F 12/00 | (2006.01) | |

(52) U.S. Cl.
CPC .......... *G06F 3/0611* (2013.01); *G06F 3/0616* (2013.01); *G06F 3/0659* (2013.01); *G06F 3/0674* (2013.01); *G06F 9/546* (2013.01); *G06F 12/0804* (2013.01); *G06F 12/0868* (2013.01); *G06F 12/00* (2013.01); *G06F 2212/1016* (2013.01); *G06F 2212/1036* (2013.01); *G06F 2212/463* (2013.01); *G06F 2212/466* (2013.01)

(58) Field of Classification Search
CPC .... G06F 3/0611; G06F 3/0616; G06F 3/0659; G06F 12/0804; G06F 12/0868; G06F 12/08; G06F 12/00; G06F 2212/1061; G06F 2212/1036; G06F 2212/46; G06F 2212/461–466
See application file for complete search history.

(56) References Cited

U.S. PATENT DOCUMENTS

| | | | |
|---|---|---|---|
| 6,389,420 B1 | 5/2002 | Vahalla et al. | |
| 2003/0088591 A1* | 5/2003 | Fish .................. | G06F 17/30902 |
| 2004/0230746 A1* | 11/2004 | Olds .................. | G06F 12/0804 |
| | | | 711/133 |
| 2005/0171982 A1 | 8/2005 | Deo et al. | |
| 2007/0226320 A1 | 9/2007 | Hager et al. | |
| 2008/0052738 A1 | 2/2008 | Steenbergen | |
| 2010/0114977 A1 | 5/2010 | Bacher et al. | |
| 2010/0169543 A1 | 7/2010 | Edgington et al. | |
| 2010/0306448 A1* | 12/2010 | Chen .................. | G06F 12/0804 |
| | | | 711/103 |
| 2013/0024648 A1 | 1/2013 | Chen et al. | |
| 2013/0262746 A1* | 10/2013 | Srinivasan .......... | G06F 12/0246 |
| | | | 711/103 |

(Continued)

OTHER PUBLICATIONS

International Search Report and Written Opinion for PCT/US2017/046327 dated Oct. 19, 2017, pp. 21.

*Primary Examiner* — Tracy A Warren
(74) *Attorney, Agent, or Firm* — J. Fish Law, PLLC

(57) ABSTRACT

A device may be configured to perform techniques that efficiently write back data to a storage device. A file system driver may be configured to delay write backs. A file system driver may be configured to extend a range of pages that are written back to a storage device.

20 Claims, 9 Drawing Sheets

(56) References Cited

U.S. PATENT DOCUMENTS

2013/0275391 A1  10/2013  Batwara et al.
2014/0189286 A1   7/2014  Chang et al.
2015/0193461 A1   7/2015  Altaparmakov et al.
2016/0070444 A1   3/2016  Valimaki et al.

* cited by examiner

SYSTEMS AND METHODS FOR WRITING BACK DATA TO A STORAGE DEVICE

RELATED APPLICATIONS

This application claims the benefit of U.S. Provisional Application No. 62/373,650, filed on Aug. 11, 2016, which is incorporated by reference in its entirety.

TECHNICAL FIELD

This disclosure relates to systems and methods for memory management and more particularly to techniques for writing back data to a storage device.

BACKGROUND

Devices including laptop or desktop computers, tablet computers, televisions, digital video recorders (DVRs), set-top boxes, digital media players, video gaming devices, video gaming consoles, video surveillance systems, and cellular telephones may utilize file systems to control how data is stored on and retrieved from a computer readable medium. For example, a device may read data from and write data to a storage device, such as, a memory card (e.g., a Secure Digital (SD) memory card, including Standard-Capacity (SDSC), High-Capacity (SDHC), and eXtended-Capacity (SDXC) formats), a hard disk drive (HDD), and/or a solid state drive (SSD) including a Universal Serial Bus (USB) solid state drive (a so-called "flash," "thumb," or "jump" drive) according to a defined file system volume. Types of file systems include, for example, files systems based on the Extended File System (ext), file systems based on the Hierarchical File System (HFS), file systems based on the XFS file system, file systems based on the Z File System (ZFS), file systems based on the New Technology File System (NTFS), file systems based on Flash File Systems (FFS) and file systems based on File Allocation Table (FAT) file systems, including the FAT12, FAT16, FAT32, exFAT, and transactional exFAT files systems. Respective data objects (e.g., files) may be stored to a storage device within a volume defined by a file system. Multiple applications may instruct respective data objects stored within volume to be modified.

A device may implement a cache in device memory as an intermediary for reading data from and writing data to a storage device. Implementing a cache may improve system performance, as reading data from and writing data to device memory is orders of magnitude faster than reading data from and writing data to a storage device. As data is written to a cache in device memory, e.g., an application causes a file to be updated, corresponding data on a storage device becomes out of date. The process of propagating changes to data to the corresponding storage device may be referred to as writing back data or as a write back (or writeback). Current techniques for writing back data to a storage device may be less than ideal.

SUMMARY

In general, this disclosure describes techniques for performing write backs. In particular, this disclosure describes techniques for optimizing write backs. The techniques described herein may cause write backs to be committed to a storage device in an efficient manner. The techniques described herein may improve system performance and extend the lifetime of a storage device. It should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

According to one example of the disclosure, a method for managing write backs to a storage device comprises receiving a request to write an instance of an inode object to a storage device, determining whether a time threshold for metadata write backs has been exceeded, and upon determining that the time threshold has been exceeded, causing the instance of the inode object to be committed to the storage device.

According to another example of the disclosure, a device comprises one or more processors configured to receive a request to write an instance of an inode object to a storage device, determine whether a time threshold for metadata write backs has been exceeded, and cause the instance of the inode object to be committed to the storage device, upon determining that the time threshold has been exceeded.

According to another example of the disclosure, a non-transitory computer-readable storage medium comprises instructions stored thereon, that upon execution, cause one or more processors of a device to receive a request to write an instance of an inode object to a storage device, determine whether a time threshold for metadata write backs has been exceeded, and cause the instance of the inode object to be committed to the storage device, upon determining that the time threshold has been exceeded.

According to another example of the disclosure, an apparatus comprises means for receiving a request to write an instance of an inode object to a storage device, means for determining whether a time threshold for metadata write backs has been exceeded, and means for causing the instance of the inode object to be committed to the storage device, upon determining that the time threshold has been exceeded.

According to one example of the disclosure, a method for managing write backs to a storage device comprises receiving a request to write back data in a range of pages associated with an inode to a storage device, determining whether the inode corresponds to a data object stored to a contiguous data region of the storage device, determining whether the contiguous data region is inclusive of the range of pages, and upon determining that the contiguous data region is inclusive of the range of pages, extending the range of pages and causing data in the extended range of pages to be committed to the storage device.

According to another example of the disclosure, a device comprises one or more processors configured to receive a request to write back data in a range of pages associated with an inode to a storage device, determine whether the inode corresponds to a data object stored to a contiguous data region of the storage device, determine whether the contiguous data region is inclusive of the range of pages, and extend the range of pages and cause data in the extended range of pages to be committed to the storage device, upon determining that the contiguous data region is inclusive of the range of pages.

According to another example of the disclosure, a non-transitory computer-readable storage medium comprises instructions stored thereon, that upon execution, cause one or more processors of a device to receive a request to write back data in a range of pages associated with an inode to a storage device, determine whether the inode corresponds to a data object stored to a contiguous data region of the storage device, determine whether the contiguous data region is inclusive of the range of pages, and extend the range of pages and cause data in the extended range of pages to be committed to the storage device, upon determining that the contiguous data region is inclusive of the range of pages.

According to another example of the disclosure, an apparatus comprises means for receiving a request to write back data in a range of pages associated with an inode to a storage device, means for determining whether the inode corresponds to a data object stored to a contiguous data region of the storage device, means for determining whether the contiguous data region is inclusive of the range of pages, and means for extending the range of pages and causing data in the extended range of pages to be committed to the storage device, upon determining that the contiguous data region is inclusive of the range of pages.

The details of one or more examples are set forth in the accompanying drawings and the description below. Other features, objects, and advantages will be apparent from the description and drawings, and from the claims.

DETAILED DESCRIPTION

Figure 1:
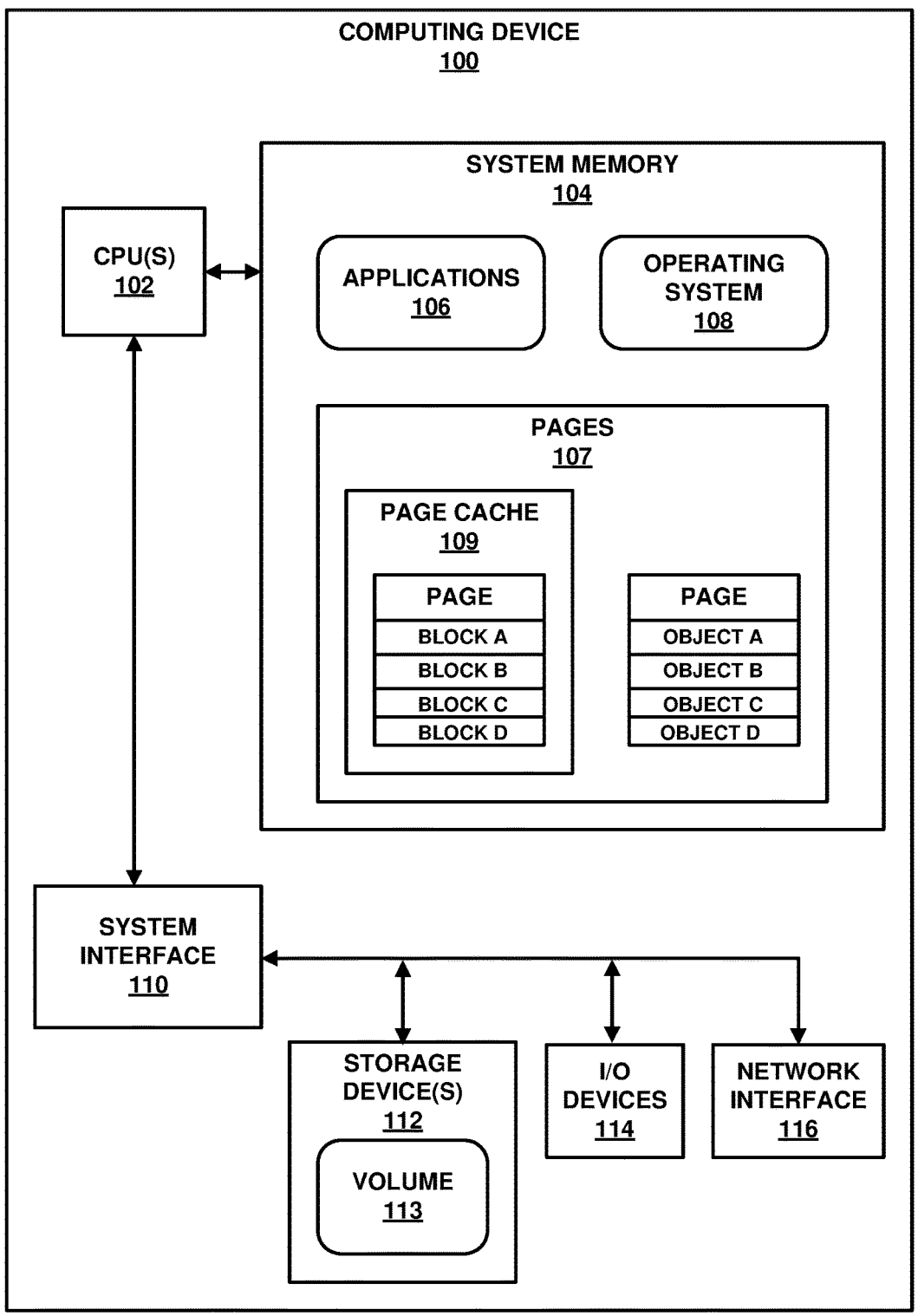
FIG. 1 is a block diagram illustrating an example of a computing device that may implement one or more techniques of this disclosure.

A device may implement a cache in device memory as an intermediary for reading data from and writing data to a storage device. An example of a cache in device memory includes the page cache in the Unix based operating system Linux. It should be noted that although the techniques described herein are described with respect to Linux, the techniques described herein may be generally applicable to writing back data to a storage device for any type of operating system. In Linux, a page represents a basic unit of memory. In Linux, a page includes physical pages in Random Access Memory (RAM). A common page size for central processing unit architectures is 4096 bytes (i.e., 4 kilobytes (kiB)). Other example page sizes may include 8 kiB, 16 kiB, 32 kiB, 64 kiB, etc. A page may store data corresponding to a defined data structure. For example, as described in further detail below, a page may store data corresponding to an instance of an inode object structure. Further, a page may store data corresponding to physical blocks on a storage device. Pages storing data corresponding to physical blocks on a storage device are included in a page cache. Pages in a page cache may include blocks, where a block may represent one or more sectors of a storage device. The number of bytes per sector may be based on a storage device, where a sector represents the smallest addressable unit of a storage device. For example, a common sector size is 512 bytes for hard disk drives and CD-ROM discs have sectors of 2048 bytes. Thus, in one example, a 4 kiB page in a page cache may include four blocks, where each block represents two 512 bytes sectors on a storage device. It should be noted that for flash memory based storage devices, the term block may refer to the smallest unit of data that may be erased (i.e., an erase block). For flash memory based storage devices, an erase block includes a number of pages, where a page in the context of a flash memory device refers to the smallest unit of data that can be written to. Typically, in a flash memory based storage device, pages need to be erased before they can be written to. Typical block and page sizes for a flash memory based storage devices are respectively 4-8 MB (2^20 bytes) and 8-16 kiBs. As used herein, the term sector may include a page of a flash memory device.

In Linux, if an application initiates a process to open a file, the Linux kernel searches the page cache to determine whether the data has been stored to the page cache. If the data is stored to the page cache, the data is read from the page cache without accessing the storage device. If the data is not stored to the page cache, the data is read from the storage device and added to the page cache for subsequent access. If an application initiates a process to write data to a file, data in the page cache is updated. When data is updated in the page cache, the corresponding data stored on the storage device becomes out of date. It should be noted that in this case, the storage device may be referred to as the backing store. Pages in the page cache are not synchronized with sectors of data on the backing store and are said to be dirty. Dirty pages are eventually written back to the backing store. In one example, an application may initiate a process to synchronize the data (e.g., upon application shutdown or a user activating a save icon). It should be noted that system performance may be based on how frequently write backs occur. That is, typically, it is desirable to limit the number of times a storage device is accessed, as accessing a storage device is relatively time consuming and can reduce system performance. However, data that is not written back to a storage device may be lost in the event of a system failure. The Linux kernel includes a virtual file system that includes defined methods that may be called to invoke various types of write backs.

Data stored on a backing store may be arranged, organized, and/or managed on a storage device according to a defined file system. For example, the Microsoft Extensible Firmware Initiative FAT32 File System Specification defines aspects of the FAT32 file system and Microsoft exFAT Revision 1.00 File System Basic Specification (fourth release, 1 Jan. 2009), defines aspects of the exFAT file system. Further, file systems may include other proprietary file systems. It should be noted that although the techniques described herein are described with respect to FAT file systems, the techniques described herein may be generally applicable to any defined file system. A file system may specify the structure and requirements of a volume, where a volume is a set of logical structures defined for a data space necessary to store and retrieve user data. As described in detail below with respect to FIG. 4, a FAT file system volume may include boot record(s), file allocation table(s), user data, and metadata corresponding to user data. User data may include directories and files, and/or similar data structures. Each of a directory, file, and/or similar data structures may generally be referred to as a data object or data item. Metadata corresponding to user data may include records associated with user data. As described above, and in further detail below, the Linux kernel includes a virtual file system. A virtual file system includes defined data structures that serve as an abstraction that enables applications to interoperate with various defined file systems. For example, Linux defines an inode data structure that is a virtual representation of a data object included in a file system volume.

User data may be physically stored to one or more sectors of a storage device. File systems may define a cluster (or allocation unit) according to a number of sectors, where a cluster is the smallest logical unit of memory that can be allocated to a data object. Thus, one or more clusters are allocated to each data object stored on a storage device. File allocation table(s), allocation bitmap(s), and/or similar logical structures within a file system provide a mapping of data objects to one or more allocated clusters, and as such may be referred to as allocation mapping structures. As described in further detail below, file system drivers may cause data objects to be modified on a storage device. For example, a file system driver may receive a write back request, e.g., in response to an application system call, and may cause clusters allocated to a data object to be overwritten with data included in a page cache. It should be noted that file allocation table(s), allocation bitmap(s), and similar logical structures within a file system may be required to be updated as clusters allocated to a data object change.

When a file is being written to, for example, during normal user access, pages corresponding to data included in the file, pages corresponding to the file metadata, and/or pages corresponding to file system structures may become unsynchronized with corresponding data stored to a storage device. As described above, the virtual file system in Linux includes methods that may be invoked to cause a backing store to be updated. It should be noted that in some cases, methods causing a backing store to be updated may be invoked several times a second, which in a typical Linux storage stack causes corresponding writes to be committed to the storage device. In some cases, performing excessive writes to a storage device may cause the lifetime of the storage device to be reduced. For example, flash based storage devices may have a finite number of write cycles. Further, writing data to a storage device is a relatively time consuming process and performing excessive writes may reduce system performance. The techniques described herein may be used to cause write backs to be committed to a storage device in an efficient manner.

FIG. 1 is a block diagram illustrating an example of a computing device that may implement one or more techniques of this disclosure. Computing device 100 may include one or more processors and a plurality of internal and/or external storage devices. Examples of storage devices include file servers, FTP servers, network attached storage (NAS) devices, a local disk drive, removable memory devices, such as, for example, memory cards and USB memory devices, or any other type of device or storage medium capable of storing data. A storage medium may include an optical storage medium (e.g., DVDs, CD-ROMs, etc.), a magnetic storage medium, a flash memory, or any other suitable digital storage media. When the techniques described herein are implemented partially in software, a device may store instructions for the software in a suitable, non-transitory computer-readable medium and execute the instructions in hardware using one or more processors.

Computing device 100 is an example a computing device configured to store data on or retrieve data from a computer readable medium. Data may include, for example, application files, document files, media files (audio and/or video files), and the like. Computing device 100 may be equipped for wired and/or wireless communications and may include devices, such as, for example, desktop or laptop computers, mobile devices, smartphones, cellular telephones, tablet devices, set top boxes, DVRs, surveillance systems, personal gaming devices, and automotive infotainment systems. As illustrated in FIG. 1, computing device 100 includes central processor unit(s) 102, system memory 104, system interface 110, storage device(s) 112, input/output (I/O) device(s) 114, and network interface 116. As illustrated in FIG. 1, system memory 104 includes applications (apps) 106, operating system 108, and pages 107. As illustrated in FIG. 1, storage device(s) 112 includes volume 113. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

Central processing unit(s) 102 may be configured to implement functionality and/or process instructions for execution in computing device 100. Central processing unit (s) 102 may be capable of retrieving and processing instructions, code, and/or data structures for implementing one or more of the techniques described herein. Instructions may be stored on a computer readable medium, such as system memory 104 or storage device(s) 112. Central processing unit(s) 102 may include digital signal processors (DSPs), general purpose microprocessors, application specific integrated circuits (ASICs), field programmable logic arrays (FPGAs), or other equivalent integrated or discrete logic circuitry. Central processing unit(s) 102 may include one or more multi-core central processing units. Central processing unit(s) 102 may operate according to a page size.

System memory 104 may be configured to store information that may be used by computing device 100 during operation. System memory 104 may be described as a non-transitory or tangible computer-readable storage medium. In some examples, system memory 104 may provide temporary memory and/or long-term storage. In some examples, system memory 104 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. In one example, system memory 104 may include an internal hard disk drive and/or an internal flash memory. As illustrated in FIG. 1, system memory 104 includes pages 107. As described above, pages may include physical pages in RAM. In the example illustrated in FIG. 1, pages 107 includes page cache 109 which includes pages corresponding to physical blocks on a storage device and pages including objects. Examples of page caches are described above. Examples of objects include instances of defined data structures. For example, objects may include instances of data structures defined for an example virtual file system. Examples of data structures defined for an example virtual file system are described in detail below.

System interface 110 may be configured to enable communications between components of computing device 100. In one example, system interface 110 comprises structures that enable data to be transferred from one peer device to another peer device or to a storage medium. For example, system interface 110 may include a chipset supporting Peripheral Component Interconnect (PCI), Peripheral Component Interconnect Express (PCIe) bus protocols, proprietary bus protocols, or any other form of structure that may be used to interconnect peer devices.

Storage device(s) 112 represent memory of computing device 100 that may be configured to store different amounts of information for different periods of time than system memory 104. Similar to system memory 104, storage device(s) 112 may also include one or more non-transitory or tangible computer-readable storage media. Storage device(s) 112 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive. Data stored on storage device(s) 112 may be stored according to a defined file system, such as, for example FAT12, FAT16, FAT32, exFAT, transactional exFAT, NTFS, and/or proprietary files systems. As illustrated in FIG. 1, storage device(s) 112 include volume 113. Volume 113 may include a volume defined according to a file system.

I/O device(s) 114 may be configured to receive input and provide output for computing device 100. Input may be generated from an input device, such as, for example, a touch-sensitive screen, a track pad, a track point, a mouse, a keyboard, a microphone, one or more video cameras, or any other type of device configured to receive input. Output may be provided to output devices, such as, for example speakers or a display device. In some examples, I/O device(s) 114 may be external to computing device 100 and may be operatively coupled to computing device 100 using a standardized communication protocol, such as for example, Universal Serial Bus protocol (USB).

Network interface 116 may be configured to enable computing device 100 to communicate with external computing devices via one or more networks. Network interface 116 may be a network interface card, such as an Ethernet card, an optical transceiver, a radio frequency transceiver, or any other type of device that can send and receive information. Network interface 116 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 1, system memory 104 includes applications 106 and operating system 108. Applications 106 may include any applications implemented within or executed by computing device 100 and may be implemented or contained within, operable by, executed by, and/or be operatively/communicatively coupled to components of computing device 100. Applications 106 may include instructions that may cause central processing unit(s) 102 of computing device 100 to perform particular functions. Applications 106 may cause central processing unit(s) 102 to write data to or read data from a computer readable medium, such as for example, system memory 104 and/or storage device(s) 112. Applications 106 may include algorithms which are expressed in computer programming statements, such as, for loops, while-loops, if-statements, do-loops, etc. Operating system 108 may be configured to facilitate the interaction of applications 106 with central processing unit(s) 102, and other hardware components of computing device 100. Operating system 108 may be an operating system designed to be installed on laptops and desktops. For example, operating system 108 may be a Windows® operating system, Linux, or Mac OS. Operating system 108 may be an operating system designed to be installed on smartphones, tablets, set-top boxes, and/or gaming devices. For example, operating system 108 may be a Windows®, Linux, Mac OS, Android, iOS, Windows Mobile®, or a Windows Phone® operating system. It should be noted that although techniques may be described according to particular example operating systems, the techniques described herein are not limited to a particular operating system.

Figure 2:
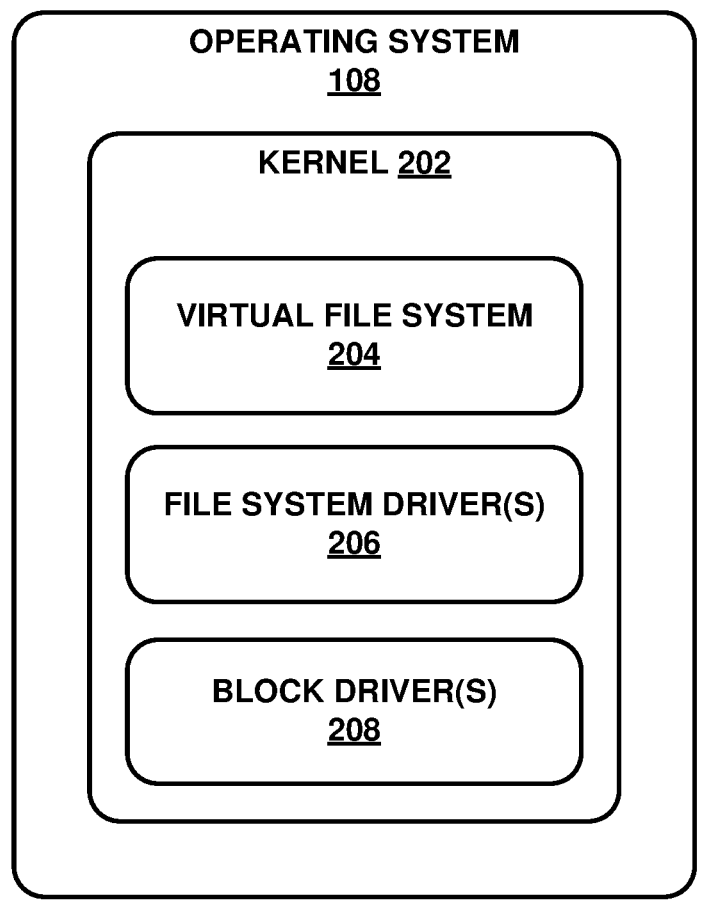
FIG. 2 is a block diagram illustrating an example of an operating system of a computing device that may implement one or more techniques of this disclosure.

FIG. 2 is a block diagram illustrating an example of an operating system of a computing device that may implement one or more techniques of this disclosure. As illustrated in FIG. 2, operating system 108 includes kernel 202. In one example, kernel 202 may be a kernel based on a Linux kernel. In other examples, kernel 202 may be a component or subset of instructions of an operating system. As illustrated in FIG. 2, kernel includes virtual file system 204, file system driver(s) 206, and block driver(s) 208. Virtual file system 204 is an example of an abstraction that enables application(s) 106 to interoperate with various defined file systems. For example, application(s) 106 may issue system calls, e.g., standard Unix systems calls, and virtual file system 204 may cause calls to be invoked in a particular file system. Virtual file system 204 may define interfaces and data structures. Examples of data structures that may be defined for a virtual file system are illustrated in FIG. 3.

File system drivers 206 may be configured to provide a layer of abstraction between virtual file system 204 and a storage device, such as, for example storage device(s) 112. In one example, file system drivers 206 may be configured to allow data to be stored to system memory 104 and/or storage device(s) 112 according to a file system based on a File Allocation Table (FAT) file system, including FAT12, FAT16, FAT32, exFAT, transactional exFAT, NTFS, and/or proprietary files systems, including Tuxera Flash File Systems (TFFS). It should be noted that in some examples, file system drivers 206 may be implemented as one driver binary that implements multiple file systems (e.g., both FAT and exFAT file systems). In other examples, file system drivers 206 may include a separate binary driver for respective file systems. Block driver(s) 208 may be configured to cause storage device I/O operations to occur. For example, when a user wishes to open a file, which is not available in a page cache, block driver(s) 208 may receive a request to read blocks corresponding to the file from a storage device. It should be noted that in some examples, block driver(s) 208 may include an I/O scheduler. An I/O scheduler may manage I/O requests. For example, an I/O schedule may prioritize read requests over write requests, as an application may need to read data from a file before the application can continue, whereas write requests may be less time sensitive in terms of system performance.

Figure 3:
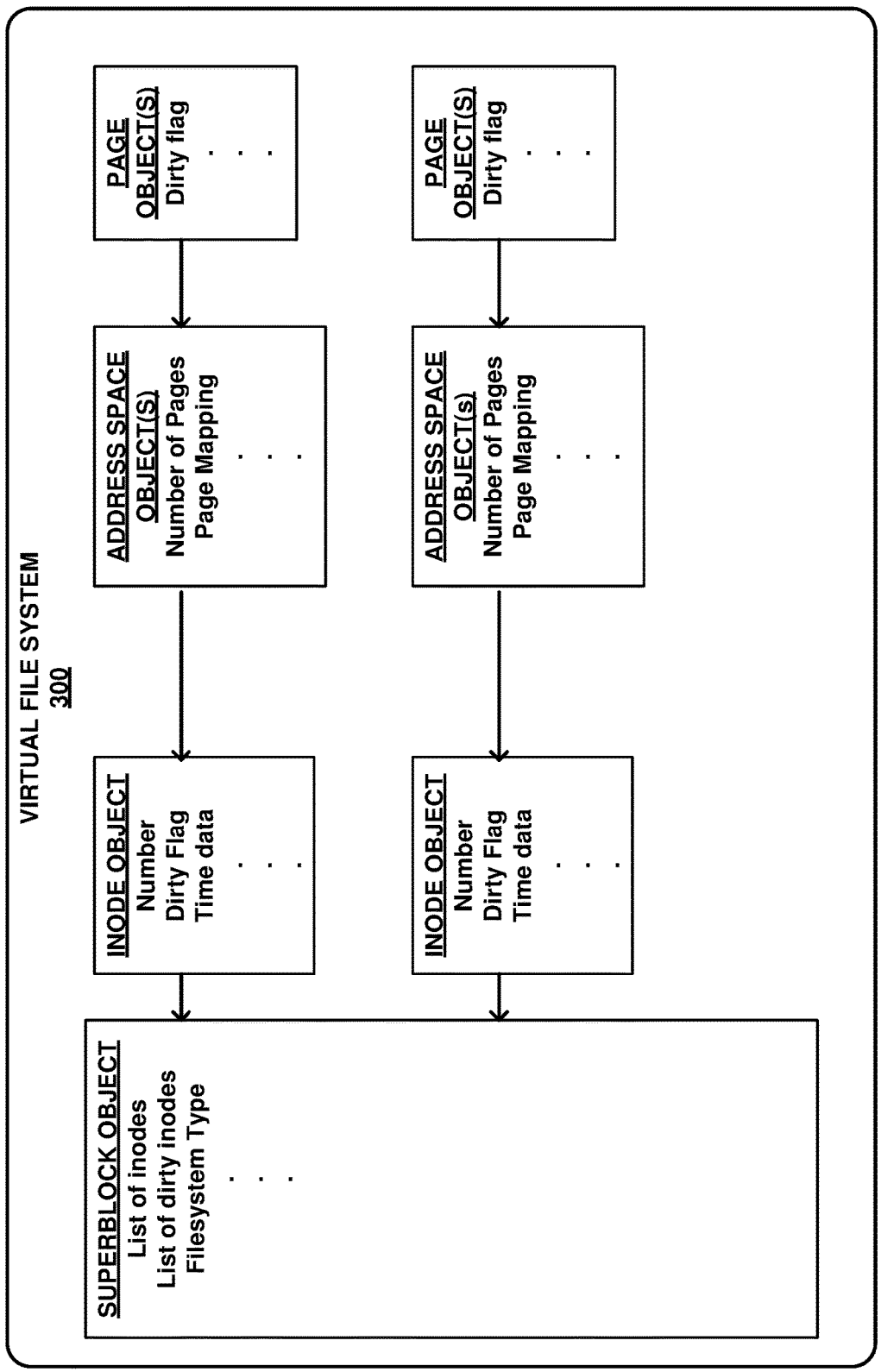
FIG. 3 is a conceptual diagram illustrating examples of data structures defined for an example virtual file system according to one or more techniques of this disclosure.

As described above, a virtual file system 204 may define data structures, FIG. 3 is a conceptual diagram illustrating examples of data structures defined for an example virtual file system according to one or more techniques of this disclosure. The example virtual file system 300 illustrated in FIG. 3 may correspond to a virtual file system based on the Virtual Filesystem (or Virtual File Switch) defined for the Linux Kernel. However, it should be noted that for the sake of brevity, a complete discussion of the Virtual Filesystem defined in Linux including addition data structures is not described in detail herein. However, reference is made to documentation maintained by the Linux Kernel Organization. Further, it should be noted that the techniques described herein may be generally applicable to file system abstractions. As illustrated in FIG. 3, virtual file system 300 includes superblock object, inode object, address space objects, and page objects. An instance of a superblock object represents a specific mounted file system. For example, a superblock object may represent a FAT volume stored to a storage device mounted to a computing device. As illustrated in FIG. 3, a superblock object may include a file system type (e.g., FAT32) and a list of inodes corresponding to the filesystem type. An instance of an inode object represents a specific data object (e.g., a file). For example, an inode object may represent a user file included in a FAT volume stored to a storage device. As illustrated in FIG. 3, an inode may be identified by a number.

As described above, pages storing data corresponding to physical blocks on a storage device are included in a page cache. An instance of a page object may represent a page in device memory, e.g., there may be an instance of a page object for each page included in pages 107. As illustrated in FIG. 3, page objects point to an address space object, and an address object points to an inode object. Thus, an instance of an address space object may map data corresponding to an inode (e.g., bytes of data forming a file) to physical pages. For example, an inode may correspond to a 48 KiB file, an address space object may include a mapping of twelve 4 KiB pages including the data of the file. As described above, pages in the page cache that are not synchronized with sectors of data on the backing store are said to be dirty. As illustrated in FIG. 3, data structures in virtual file system 300 includes lists and flags indicating whether pages (and thus associated inodes) are dirty. As described above, virtual file system 204 may define interfaces. Interfaces may include operation objects contained in each of the virtual file system objects. For example, a super block operations object may include methods that can be invoked on a specific file system and an inode operations object may include methods that can be invoked on an inode, examples of these methods are described in further detail below.

Figure 4:
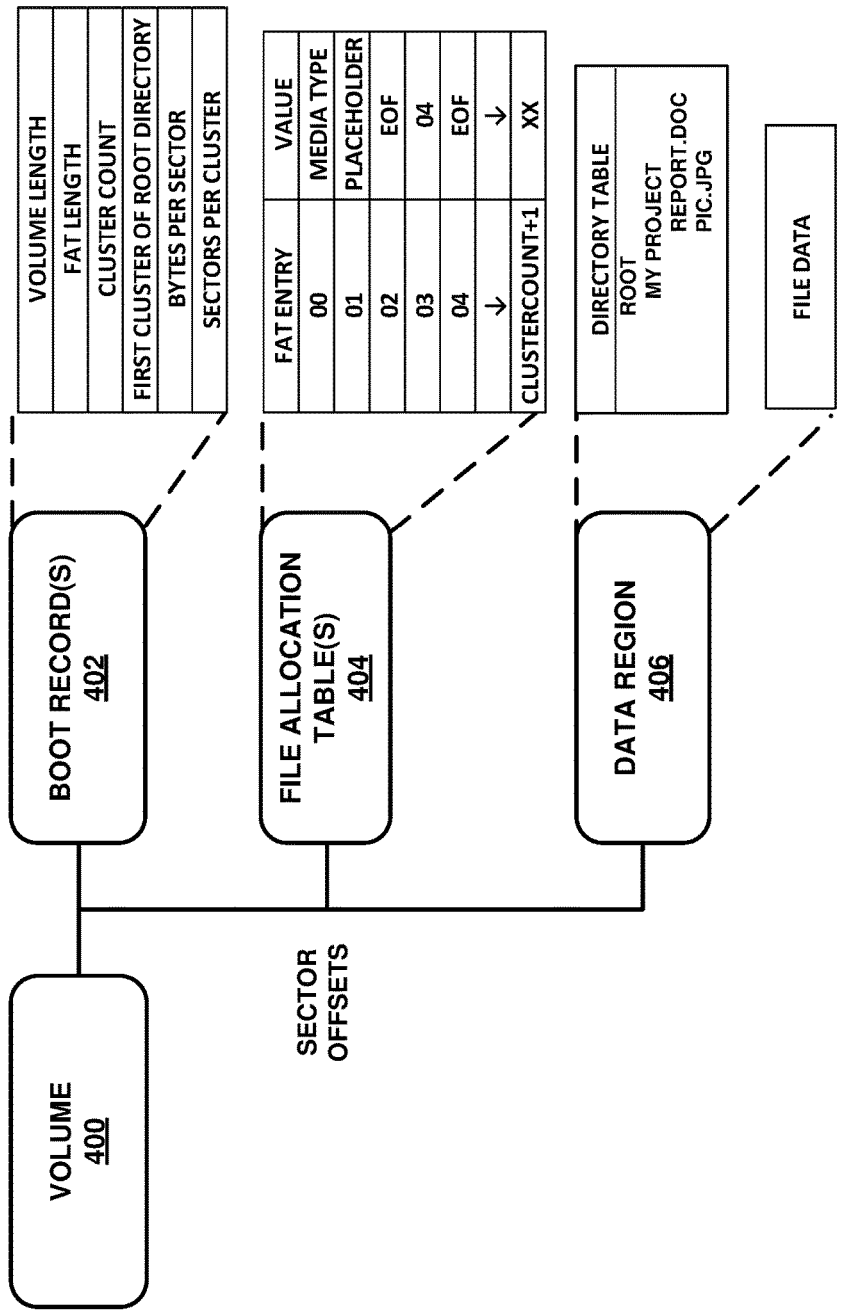
FIG. 4 is a conceptual diagram illustrating an example of a volume defined according to an example file system.

As described above, volume 113 may include a volume defined according to a file system. FIG. 4 is a conceptual diagram illustrating an example of a volume defined according to an example file system. In one example, volume 400 may be defined according to the FAT file system. It should be noted that although in some examples volume 400 is described with respect to a FAT file system, the techniques described herein are not limited to a FAT file system and may be used with other file systems. Further, it should be noted that example volume 400 represents an illustrative example of a volume and, for the sake of brevity, is not intended as an exhaustive description of a volume defined according to a file system. Additional details of a volume may be found in a corresponding file system specification. For example, in the case where volume 400 is defined according to a file system based on the one or more of the FAT12, FAT16, and FAT32 file systems, additional details of volume may be found in the Microsoft Extensible Firmware Initiative FAT32 File System Specification (version 1.03 Dec. 6, 2000).

In the example illustrated in FIG. 4, volume 400 includes boot record(s) 402, file allocation table(s) 404, and data region 406. Each of boot record(s) 402, file allocation table(s) 404, and data region 406 may be addressable on a storage device, such as, and for example, storage device(s) 112, according to a sector value. Boot record(s) 402 include data entries describing file system parameters. In one example, boot record(s) 402 include data for bootstrapping the volume, fundamental file system parameters for the volume, and various error checking information. Boot record(s) 402 may include one or more boot records. In one example, boot record(s) 402 include a primary boot record and a backup boot record, where the backup boot record is a replica of the primary boot record. As illustrated in FIG. 4, examples of information included in boot record(s) 402 include volume length, file allocation table length, cluster count, first cluster of root directory, bytes per sector, and sectors per cluster. In one example, volume length specifies the size of the volume 400 in sectors. In one example, file allocation table length specifies the size of a file allocation table 404 in sectors. In one example, cluster count specifies the number of clusters included in data region 406. It should be noted that although not illustrated in FIG. 4, boot record(s) 402 may also include information indicating a percentage of clusters which are allocated and information that allows volume 400 to be boot-strapped.

In one example, first cluster of root directory specifies a sector location of the root directory in data region 406. In one example, bytes per sector specifies the number of bytes included in a sector. In one example, the number of bytes per sector may be expressed in power of 2 notation and may range from a minimum of 512 bytes per sector to a maximum of 4096 bytes per sector. In one example, sectors per cluster specifies the number of sectors per cluster. In one example, the minimum number of sectors per cluster may be one and the maximum number of sectors per cluster may provide for a maximum cluster size of 32 kiB. It should be noted that, in some examples, the size of a cluster may be dependent on the volume size. For example, for standard compliant FAT volumes for the largest volumes, defined as volumes greater than 32 Gigibytes (GiB) (where 1 GiB is $1,024^3$ bytes), the cluster size would be the maximum cluster size for FAT, which is 32 kiB (e.g., 64 sectors of 512 bytes or 8 sectors of 4096 bytes). A standard compliant 32 GiB FAT volume would use clusters having a size of 16 kiB. A standard compliant 16 GiB FAT volume would use 8 kiB clusters. A standard compliant 8 GiB FAT volume would use 4 kiB clusters.

File allocation table(s) 404 may include one or more file allocation tables. In one example, file allocation table(s) 404 includes a single file allocation table 304. In another example, file allocation table(s) 404 includes two or more file allocation tables. File allocation table(s) 404 may be used to describe a sequence of clusters (also, referred to as a chain of clusters) that are allocated to a data object, such as a file, in data region 406. As illustrated in FIG. 4, a file allocation table may include an entry and a value corresponding to the entry. In the example illustrated in FIG. 4, entry 00 includes a value indicating a media type and entry 01 includes a placeholder value. Entries 02 through ClusterCount+1 may provide information describing sequences of clusters allocated to a data object. In one example, entries may include a value indicating a subsequent cluster entry in a sequence of clusters, a value indicating a "bad" cluster, a value indicating that the cluster is not in use, or a value indicating the end of a sequence of clusters (EOF).

In the example illustrated in FIG. 4, root file directory begins at cluster 02. As illustrated in FIG. 4, entry 02 includes an EOF marker which indicates that the root directory is not assigned any additional clusters. Further, in the example illustrated in FIG. 4, a file begins at cluster 03. As illustrated in FIG. 4, entry 03 includes an address of 04, indicating that the next cluster in the sequence for the file is cluster 04. Entry 04 includes an EOF marker which indicates that the file is not allocated any additional clusters. In this manner, file allocation table(s) may be used to identify a sequence of clusters allocated to a data object. It should be noted that although in the example illustrated in FIG. 4 that the clusters allocated to an data object are consecutive, in other examples, clusters allocated to an data object may include clusters that are not consecutive (e.g., entry 03 pointing to entry 07, etc.).

Data region 406 may be the region of volume 400 where data that makes up a data object is stored. For example, data region 406 may include data objects representing one or more types of files. For example, data region 406 may include a word processing document, such as, for example, a Microsoft Word document, a media files, such as, for example, a JPEG file, video files, and/or other types of files. In some examples, data region 406 may be referred to a cluster heap. As described above, information regarding the configuration of data region 406 may be included in boot record(s) 402 (e.g., cluster count and percentage of clusters allocated). As illustrated in FIG. 4, data region includes directory table and file data.

A directory table may include entries describing a tree structure which indicates a relationship between files and directories. For example, directory table may indicate that a particular file is stored in a sub-directory of a parent directory. In the example illustrated in FIG. 3, directory table includes a root directory, a "My Project" directory. As further illustrated in FIG. 3, a word processing document file, ("Report.doc"), and a picture file, ("Pic.jpg"), are stored within the "My Project" directory. In the example illustrated in FIG. 4, the root directory may include general information about the volume and the data region. It should be noted that directory entries may include one or more records of different types as defined according to a file system. One or more records may map a data object to a data region. For example, a first cluster field in a record may provide an initial mapping of a file to one or more clusters of data. As data objects stored to a volume are modified, the records may be updated. For the sake of brevity a complete discussion of record types is not provided herein.

Figure 5:
FIG. 5 is a conceptual diagram illustrating an example of directory entries that include records associated with a data object according to one or more techniques of this disclosure.

Directory entries included in a directory table may include one or more records of different types. FIG. 5 is a conceptual diagram illustrating examples of directory entries that include records associated with a data object. Example directory entry 500 illustrated in FIG. 5 generally corresponds to a directory record defined according to FAT12, FAT16, and FAT32. Directory entry 500 includes directory entry record 502 (which may be referred to as a short directory entry record) and may include one or more long name directory entry record(s) 504. In the example of FAT12, FAT16, and FAT32, the order of directory entry record 502 and one or more long name directory entry record(s) 504 in one or more sectors may be as follows: one or more long name directory entry record(s) 504 and directory entry record 502. It should be noted that in other examples, other types of directory entries may be defined. For example, exFAT defines a directory entry record, a stream extension record, and a file name extension record. It should be noted that example directory entry 500 represents an illustrative example of a directory entry defined according to a file system and, for the sake of brevity, an exhaustive description of a directory entry defined according to a file system is not provided herein.

As described above, file system drivers 206 may be configured to provide a layer of abstraction between virtual file system 204 and a file system defined volume stored to a storage device. In this manner, file system drivers 206 may be configured to receive data from a volume and generate an instance of a data structure object defined for virtual file system 204. For example, referring to FIG. 3, inode object includes time data, which may include information regarding the last time a particular file was modified. An inode object may define a specific format for such information. Referring to FIG. 5, directory entry 502 includes time data information. Thus, in this case, file system drivers 206 may covert (or translate) information in a directory entry 502 to generate time data values for an instance of an inode object. Further, as described above, virtual file system 204 may define interfaces that include methods that can be invoked on a specific file system. File system drivers 206 may be configured to receive the method request and complete the method using file system specific methods. For example, virtual file system 204 may invoke a write inode method (e.g., write_inode), which requests that a given inode be written to a storage device. In this case, file system driver(s) 206 may receive the request, covert the information in the instance of an inode object, and cause the corresponding directory entry stored to a storage device to be updated. Other methods that can be invoked on a specific file system and techniques for committing corresponding data to a storage device in an efficient manner, according to one or more techniques of this disclosure, are described in further detail below.

Figure 6:
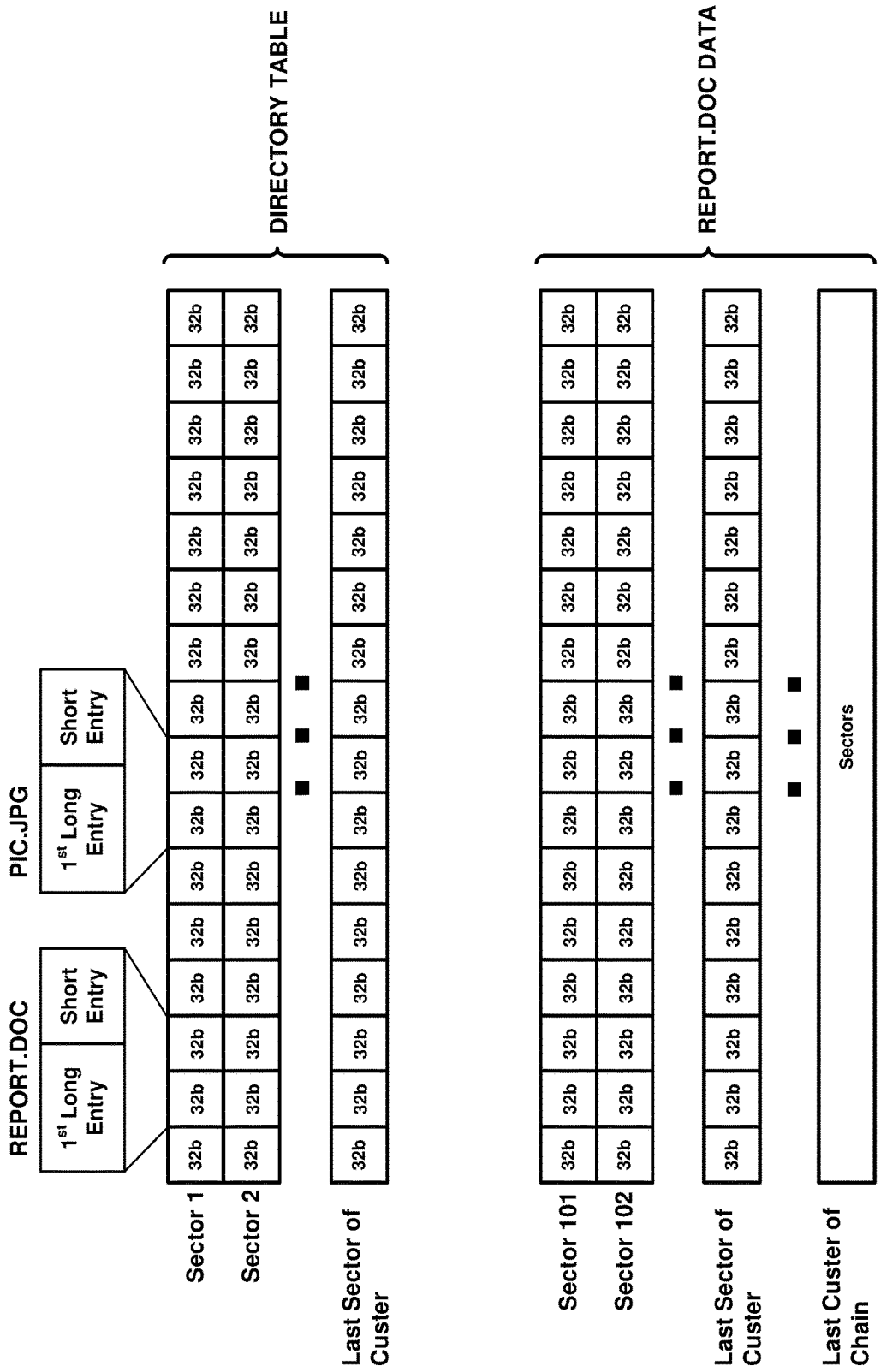
FIG. 6 is a conceptual diagram illustrating an example of directory entries associated with a data object and a data object stored to a storage device according to one or more techniques of this disclosure.

As described above, user data may be physically stored to one or more sectors of a storage device. Further, metadata, such as for example, directory entries are physically stored to one or more sectors of a storage device. FIG. 6 is a conceptual diagram illustrating an example of a directory entries associated with a data object and a data object stored to a storage device according to one or more techniques of this disclosure. In the example illustrated in FIG. 6, directory table is allocated a cluster including at least 512 byte sectors, Sector 1 and Sector 2. As illustrated in FIG. 6, directory entries for Report.doc and Pic.jpg are stored to 32 byte data slots included in Sector 1. As further illustrated in FIG. 6, Report.doc is allocated to a cluster including at least 512 byte sectors, Sector 101 and Sector 102 and additional clusters in a cluster chain. As described above, a block may include one or more sectors. Thus, Sector 1 and Sector 2 may correspond to a block in a first page and Sector 101 and Sector 102 may correspond to a block in a second page. As further described above, a file may be represented in device memory using several pages (e.g., 48 KiB file would require at least twelve 4 KiB pages). As further described above, in some examples, the size of a cluster may range from 4 KiB to 32 KiB. Thus, in some instances, pages in a page cache may be said to include chunks of a files.

As described above, when a file is being written to, pages corresponding to data included in the file become dirty. As described above, write backs may be performed to synchronize file data stored to a storage device with file data stored in a page cache. Virtual file system 204 may be configured to invoke several types of methods that request that write backs be performed with respect to particular pages. In some examples, virtual file system 204 may invoke a method which requests that for a particular inode that a number of pages starting at a particular page index be written to a backing store. Further, in one example, virtual file system 204 may invoke a method that requests that pages corresponding to a particular address object be written to a backing store. It should be noted that in some cases, methods may be invoked in order to synchronize data in some cases (e.g., before a file is closed or a device is unmounted) and in order to intermittently update data in some cases (e.g., a virtual file system may invoke periodic write back requests). Referring to FIG. 6, in the case where a request that a number of pages starting at a particular page index be written to a backing store for Report.doc, the range of pages may correspond to clusters included in a contiguous data region of a storage device. For example, in the case where Report.doc includes a contiguous cluster chain of twelve 4 kiB clusters (e.g., clusters 05 to 16), and a request to write back two 4 kiB pages may correspond to two contiguous clusters in the contiguous cluster chain (e.g., clusters 10 to 11) being overwritten. Further, as described above, virtual file system 204 may invoke a write inode method which requests that a given inode be written to a storage device. Referring to FIG. 6, in the case of a write inode method being requested for an inode corresponding to Report.doc, committing the request to the storage device would include overwriting Sector 1. It should be noted that in a typical Linux implementation, requests for write backs (e.g., requests to write back pages or write an inode to disk), whether invoked in order to synchronize data or in order to intermittently update data are simply passed by a file system driver and committed to a storage device. As described in further detail below, file system driver 206 may be configured to receive write back requests and cause write backs to be committed to a storage device in an efficient manner.

Figure 7:
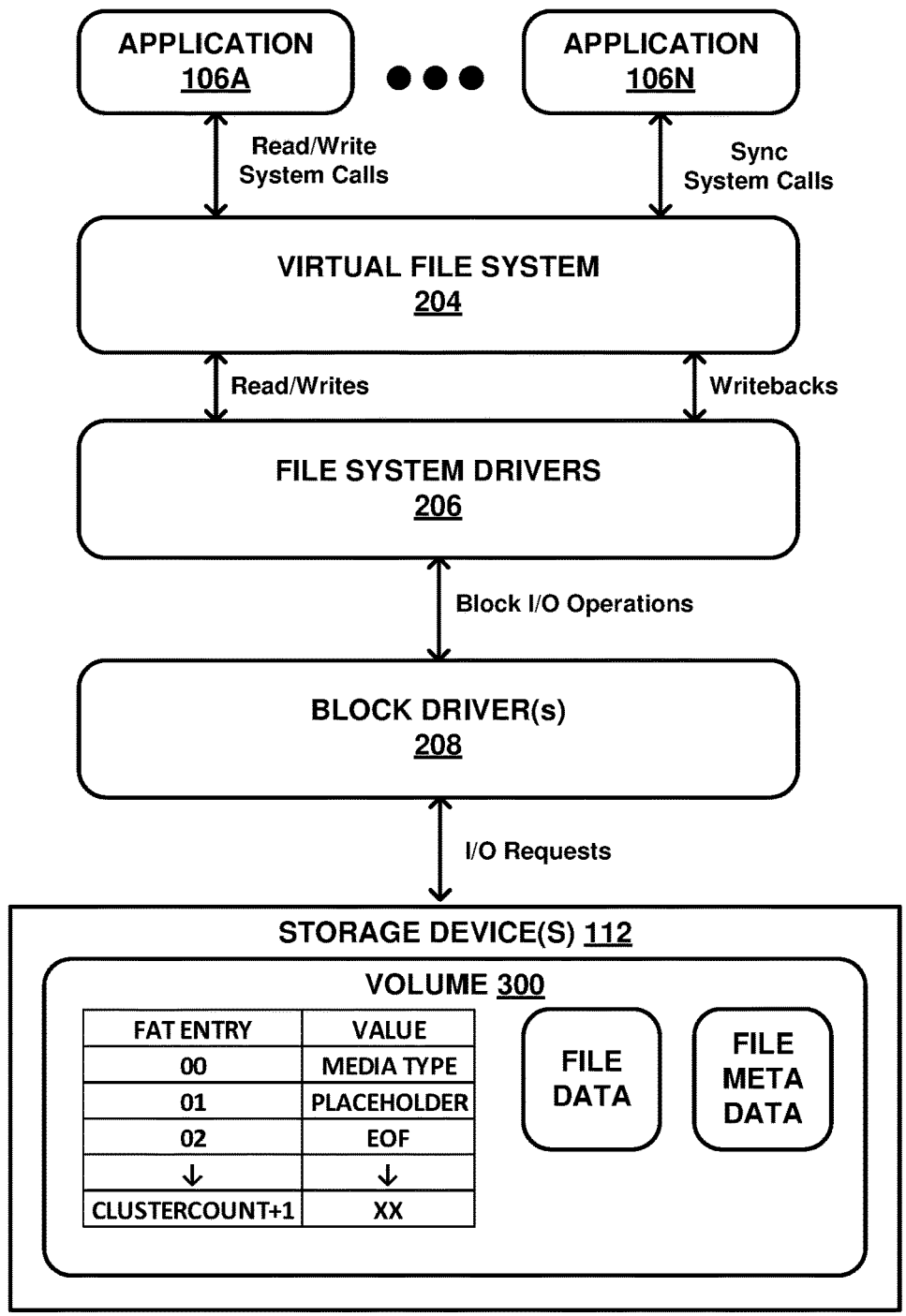
FIG. 7 is a conceptual diagram illustrating an example of a storage stack according to one or more techniques of this disclosure.
Figure 8:
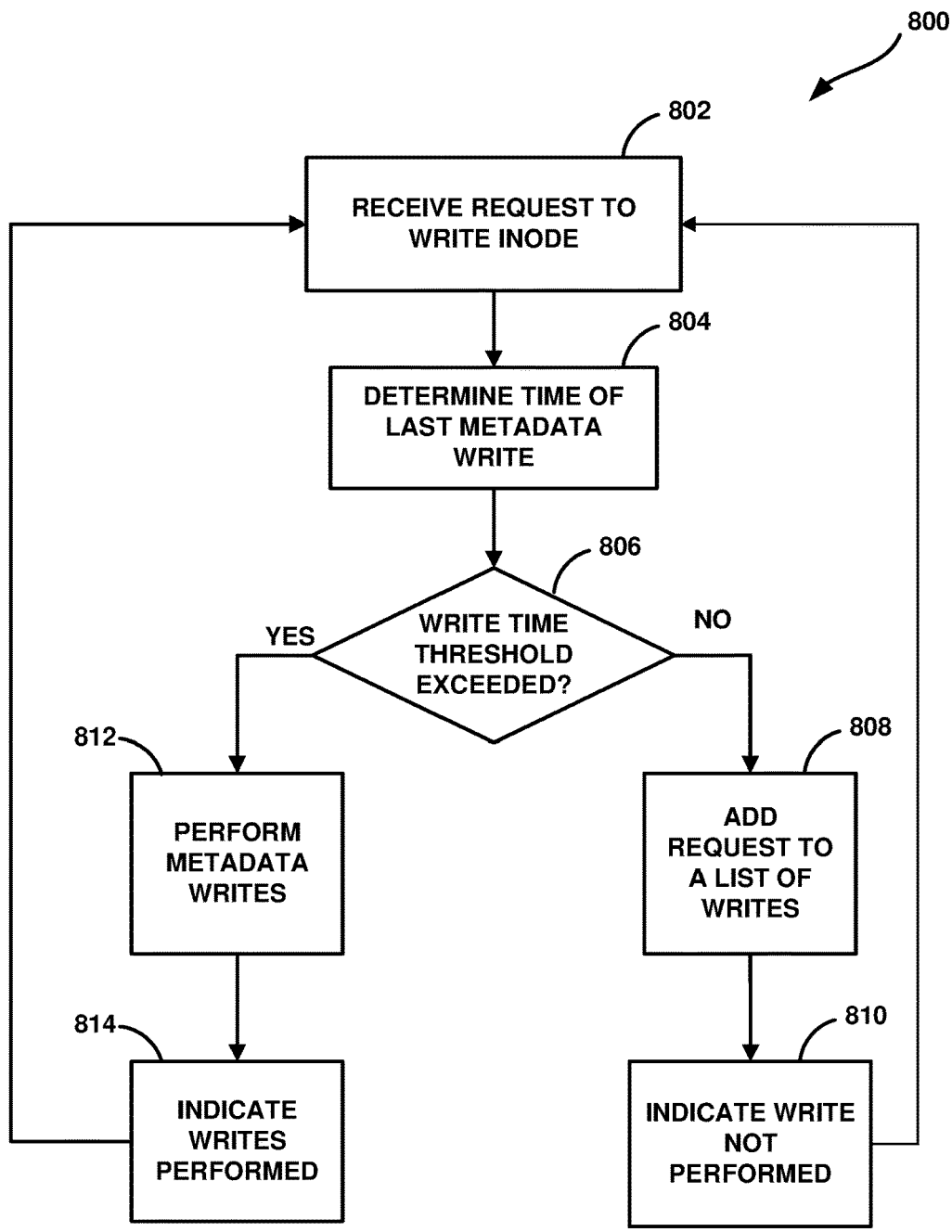
FIG. 8 is a flowchart illustrating an example of causing write back operations to be performed according to one or more techniques of this disclosure.
Figure 9:
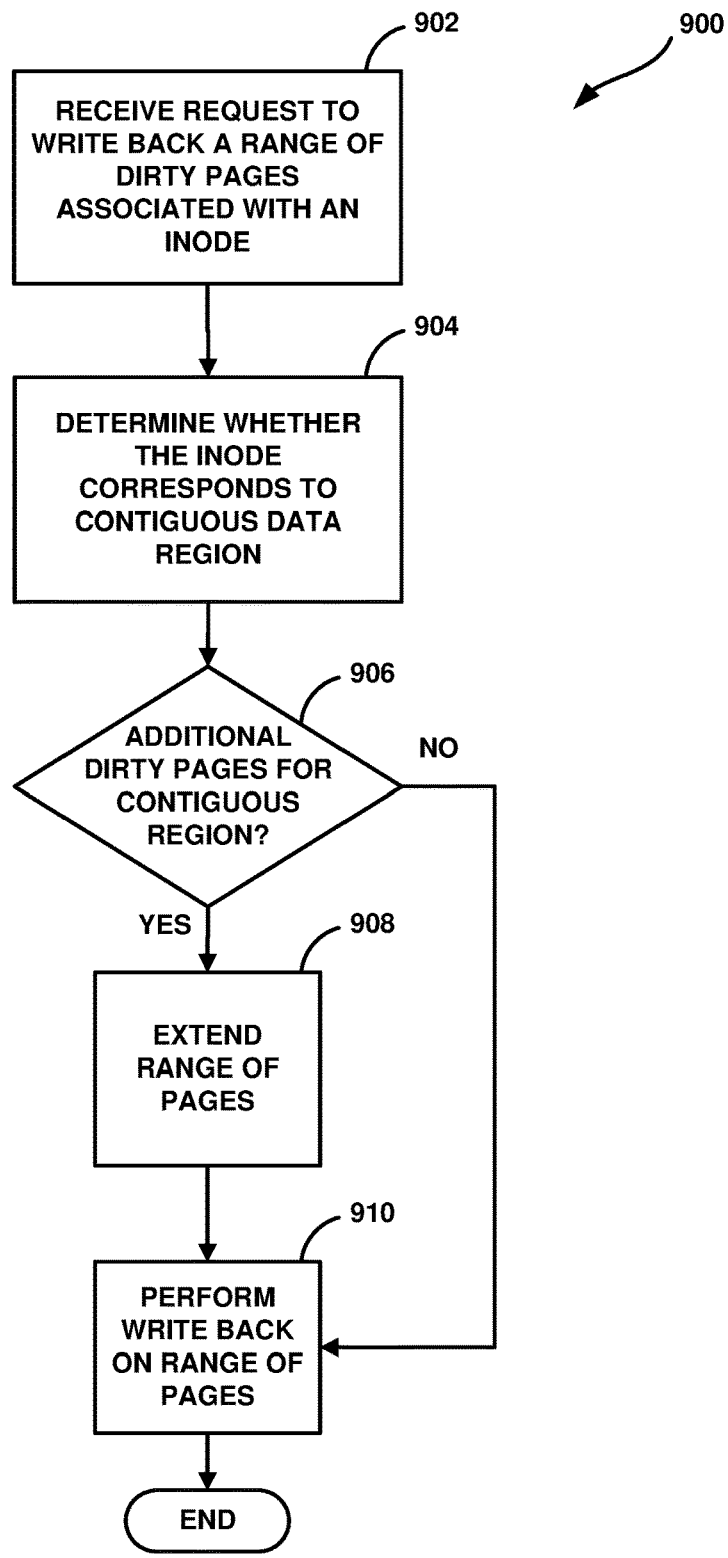
FIG. 9 is a flowchart illustrating an example of causing write back operations to be performed according to one or more techniques of this disclosure.

FIG. 7 is a conceptual diagram illustrating an example of a storage stack illustrating how write backs are committed to a storage device according to this disclosure. As illustrated in FIG. 7, applications 106A-106N may invoke read and write system calls and synchronization system calls. Virtual file system 204 may receive system calls and invoke methods in file system driver 206. That is, virtual file system 204 may invoke methods in order to synchronize data in some cases and in order to intermittently update data in some cases. File system driver 206 may receive virtual file system methods and invoke block I/O operations. Block driver(s) 208 may receive block I/O operation, schedule I/O requests, and send I/O requests to storage device(s) 112. In the event of a data write request, storage device(s) 112 may physically commit data to a storage medium in response to a request. FIG. 8 and FIG. 9 are examples of techniques that may be performed by file system driver 206 in order to cause write backs to be committed to a storage device in an efficient manner. It should be noted that although method 800 and method 900 are described as being performed by file system driver 206, methods 800 and method 900 may more generally be performed by computing device 200 and combinations of components thereof.

Referring to FIG. 8, file system driver 206 receives a request to write an inode (802). For example, virtual file system 204 may invoke a write inode request for Report.doc. In the example illustrated in FIG. 8, the request may correspond to an intermittent data update. That is, updating the data in corresponding directory records of a volume stored to a storage device may not be necessary for a subsequent data read by an application. For example, with respect to time data illustrated in FIG. 5 (e.g., last accessed or last modified data), in order to ensure fail safe operation during a subsequent mounting of the volume, it may only be necessary to update time data when the volume is unmounted or when an inode is no longer accessed. Thus, file system driver 206 may perform method 800 with respect to intermittent write inode requests and may perform other methods for synchronization write inode requests. At 804, file system driver 206 determines the time of a last metadata write. That is, for example, file system driver 206 may determine the last time a write inode request was committed to a storage device. In one example, file system driver 206 may record times of metadata writes and read a recorded time. At 806, file system driver 206 determines whether a write time threshold has been exceed. For example, a write time threshold may be X seconds, where X is a value that may be set by file system driver 206, an application, and/or a user. For example, X may be 5 for some systems and may be 10 for other systems. File system driver 206 may determine if the current time is greater than the recorded time of the last metadata write and the write time threshold (e.g., current time>recorded time+threshold).

Upon determining that the time threshold has not been exceeded, file system driver 206 may delay the write request. That is, the write request is not committed to a storage device. In the example, illustrated in FIG. 8, file system driver 206 adds the request to a list of writes (808), which may include other write requests. For example, referring to the example illustrated in FIG. 6, file system driver 206 may receive a request to write an inode for Pic.jpg and subsequently receive a request to write an inode for Report.doc. In this case, if the request to write an inode for Pic.jpg was delayed it may be included in the list of writes. At 810, file system driver 206 may indicate the request was not performed. For example, file system driver 206 may callback the virtual file system 204 and indicate the request was not performed. In some examples, file system driver 206 may set values indicating that data is not synchronized.

Upon determining that the time threshold has been exceeded, at 812, file system driver 206 may perform metadata writes. For example, file system driver 206 may cause the write request to be committed to a storage device. Further, file system driver 206 may cause the write request along with any previously delayed write requests to be committed to a storage device. For example, in the case where a request to write an inode for Pic.jpg was delayed, it may be committed to a storage device along with a current request to write an inode for Report.doc. In this manner, file system driver 206 may be configured to merge or batch intermittent inode write requests. It should be noted that in the example illustrated in FIG. 6, merging the write inode request for Pic.jpg and the write inode request for Report.doc may result in Sector 1 being overwritten one time instead of two times, which may increase the life of a storage device and improve system performance. Referring again to FIG. 8, at 814, file system driver 206 may indicate the write backs that were performed. It should be noted that in some examples, file system driver 206 may be configured to cause delayed metadata write backs to occur upon a timer expiring. For example, every Y seconds the list of delayed writes may be committed to a storage device regardless of whether a subsequent intermittent write request is received.

As described above, in addition to receiving intermittent write inode requests, file system driver 206 may receive intermittent request to write back a range of pages of an inode. Referring to FIG. 9, at 902, file system driver 206 receives a request to write back a range of dirty pages associated with an inode. In the example illustrated in FIG. 9, the request may correspond to an intermittent data update. Thus, file system driver 206 may perform method 900 with respect to intermittent write back requests and may perform other methods for synchronizations requests. As described above, in some cases where a request that a number of pages starting at a particular page index be written to a backing store may include a range of pages corresponding to clusters included in a contiguous data region of a storage device. File system driver 206 may determine whether the range of dirty pages included in the request are included in the contiguous region (904). In one example, file system driver 206 may evaluate a file allocation table. That is, file system driver 206 may determine whether a cluster chain in contiguous based on a FAT and whether the range of pages are included in the contiguous cluster chain. For example, as described above, Report.doc may include a contiguous cluster chain of twelve clusters (e.g., clusters 05 to 16), and a request to write back two pages may correspond to two contiguous clusters in the contiguous cluster chain (e.g., clusters 10 to 11) being overwritten.

Referring again to FIG. 9, at 906, file system driver 206 may determine, if there are additional dirty pages for the contiguous region. For example, in the case where Report.doc includes a contiguous cluster chain of clusters 05 to 16 and a request to write back two pages corresponds to clusters 10 to 11, file system driver 206 may determine if pages corresponding to any of clusters 05-09 and 12-16 are dirty. Upon determining that addition pages in the contiguous region are dirty, file system driver 206 may extend the range of pages (908). That is, for example, if pages 09 and 12 are dirty, file system driver 206 may extend that range of pages to correspond to clusters 09-12. At 910, file system driver 206 causes the range of pages (e.g., an extended or non-extended range) to be committed to a storage device. It should be noted that extending the range of pages may result in data regions of a storage device being overwritten one time instead of multiple times, which may increase the life of a storage device and improve system performance. For example, in the case of a flash based storage device, instead of performing two erase-write cycles, one erase-write cycle may be performed, for example when a range is extended with an erase block. Thus, in some cases an extend range may be aligned within erase block boundaries. Further, in the case of a hard disk drive storage device extending the range of pages may result in fewer seeks.

It should be noted that in some cases, in a manner similar to that described above with respect to FIG. 8, intermittent write back requests may be delayed and committed to a storage device when an additional intermittent write back request is received. For example, in the case where Report.doc includes a contiguous cluster chain of clusters 05 to 16, a request to write back clusters 10-11 may be delayed and committed to a storage device when a subsequent request to write back any of clusters 05-09 and 12-16 is received. In this manner, file system driver 206 may be configured to cause write back to be performed in an efficient manner.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for managing write backs to a storage device, the method comprising:
   receiving a first request to write an instance of an inode object to the storage device, wherein the request corresponds to a first intermittent data update;
   in response to receiving the first request, determining a set time threshold for metadata write backs has been exceeded by comparing a current time to a first recorded time associated with a first previous metadata write back, wherein the first previous metadata write back synchronizes data stored to the storage device with data in a page cache;
   in response to determining that the set time threshold has been exceeded, causing the instance of the inode object corresponding to the first request and any postponed intermittent data updates to be committed to the storage device;
   subsequent to causing the instance of the inode object corresponding to the first request and any postponed intermittent data updates to be committed to the storage device, receiving a second request to write an instance of an inode object to the storage device, wherein the second request corresponds to an second intermittent data update;
   in response to receiving the second request, determining the set time threshold has not been exceeded by comparing a current time to a second recorded time associated with a second previous metadata write back has been not exceeded;
   in response to determining that the set time threshold has not been exceeded, delaying causing the instance of the inode object corresponding to the second request to be committed to the storage device;
   subsequent to delaying causing the instance of the inode object corresponding to the second request to be committed to the storage device, determining a timer has expired; and
   in response to determining that the timer has expired, causing the instance of the inode object corresponding to the second request and any postponed intermittent data updates to be committed to the storage device.

2. The method of claim 1, wherein a request to write an instance of an inode object to a storage device corresponds to a virtual file system invoking a write inode method.

3. The method of claim 1, wherein causing the instance of the inode object to be committed to the storage device includes causing data of a directory entry record to be updated.

4. A method for managing write backs to a storage device, the method comprising:
   receiving a request to write back data in a first range of pages to the storage device, wherein the data is associated with a file;
   determining the file is stored to the storage device using a contiguous cluster chain;
   determining the contiguous cluster chain is inclusive of the first range of pages; and
   in response to determining that the contiguous cluster chain is inclusive of the first range of pages, delaying causing the first range of pages to be committed to the storage device;
   subsequent to delaying causing the first range of pages to be committed to the storage device, receiving a request to write back data associated with the file in a second range of pages to the storage device, wherein the contiguous cluster chain is inclusive of the second range of pages; and
   in response to receiving the request to write back data associated with the file in a second range of pages to the storage device, causing data in both the first range of pages and the second range of pages to be committed to the storage device.

5. The method of claim 4, wherein determining the file is stored to the storage device using a contiguous cluster chain includes evaluating a file allocation table.

6. The method of claim 4, wherein the contiguous cluster chain is within an erase block.

7. The method of claim 1, wherein a number of seconds X corresponding to the set time threshold is different from a number of seconds Y corresponding to the timer.

8. The method of claim 1, wherein set time threshold is set according to a file system driver.

9. The method of claim 8, wherein a number of seconds X corresponding to the set time threshold is different from a number of seconds Y corresponding to the timer.

10. The method of claim 1, wherein set time threshold is set according to a user.

11. The method of claim 1, wherein delaying causing the instance of the inode object corresponding to the second request to be committed to the storage device includes indicating that the second request was not performed.

12. A device for managing write backs to a storage device, the device comprising one or more processors configured to:
   receive a first request to write an instance of an inode object to the storage device, wherein the request corresponds to a first intermittent data update;
   in response to receiving the first request, determine a set time threshold for metadata write backs has been exceeded by comparing a current time to a first recorded time associated with a first previous metadata write back, wherein the first previous metadata write back synchronizes data stored to the storage device with data in a page cache;
   in response to determining that the set time threshold has been exceeded, cause the instance of the inode object corresponding to the first request and any postponed intermittent data updates to be committed to the storage device;
   subsequent to causing the instance of the inode object corresponding to the first request and any postponed intermittent data updates to be committed to the storage device, receive a second request to write an instance of an inode object to the storage device, wherein the second request corresponds to an second intermittent data update;
   in response to receiving the second request, determine the set time threshold has not been exceeded by comparing a current time to a second recorded time associated with a second previous metadata write back has been not exceeded;
   in response to determining that the set time threshold has not been exceeded, delay causing the instance of the inode object corresponding to the second request to be committed to the storage device;
   subsequent to delaying causing the instance of the inode object corresponding to the second request to be committed to the storage device, determine a timer has expired; and
   in response to determining that the timer has expired, cause the instance of the inode object corresponding to the second request and any postponed intermittent data updates to be committed to the storage device.

13. The device of claim 12, wherein a request to write an instance of an inode object to a storage device corresponds to a virtual file system invoking a write inode method.

14. The device of claim 12, wherein causing the instance of the inode object to be committed to the storage device includes causing data of a directory entry record to be updated.

15. The device of claim 12, wherein a number of seconds X corresponding to the set time threshold is different from a number of seconds Y corresponding to the timer.

16. The device of claim 12, wherein set time threshold is set according to a file system driver.

17. The device of claim 16, wherein a number of seconds X corresponding to the set time threshold is different from a number of seconds Y corresponding to the timer.

18. The device of claim 12, wherein set time threshold is set according to a user.

19. The device of claim 12, wherein delaying causing the instance of the inode object corresponding to the second request to be committed to the storage device includes indicating that the second request was not performed.

20. The method of claim 4, wherein the storage device is a hard disk drive storage device.

* * * * *